US007710987B2

(12) United States Patent
Jayapalan et al.

(10) Patent No.: US 7,710,987 B2
(45) Date of Patent: May 4, 2010

(54) EFFICIENT TRANSITIONS BETWEEN OPERATING STATES IN A COMMUNICATION NETWORK

(75) Inventors: Jay P. Jayapalan, Buffalo Grove, IL (US); Lee M. Proctor, Cary, IL (US); Shreesha Ramanna, Vernon Hills, IL (US); Steven D. Upp, Bartlett, IL (US); James A. Butler, Bartlett, IL (US); Paul M. Erickson, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 590 days.

(21) Appl. No.: 11/610,738

(22) Filed: Dec. 14, 2006

(65) Prior Publication Data

US 2008/0144574 A1 Jun. 19, 2008

(51) Int. Cl.
*H04L 12/56* (2006.01)
(52) U.S. Cl. .................. 370/410; 370/329; 370/338; 370/318; 370/331
(58) Field of Classification Search .......... 370/329, 370/318, 328
See application file for complete search history.

(56) References Cited

U.S. PATENT DOCUMENTS

| 6,965,588 | B2* | 11/2005 | Schmidt et al. ............. 370/338 |
| 7,043,249 | B2* | 5/2006 | Sayeedi ..................... 455/445 |
| 7,324,499 | B1* | 1/2008 | Borella et al. .............. 370/349 |
| 7,466,675 | B2* | 12/2008 | Hart et al. .................. 370/329 |
| 2003/0045293 | A1 | 3/2003 | Lee et al. |
| 2003/0211847 | A1* | 11/2003 | Jang et al. ................. 455/434 |
| 2004/0114553 | A1* | 6/2004 | Jiang et al. ................. 370/328 |
| 2005/0073969 | A1* | 4/2005 | Hart et al. .................. 370/318 |
| 2005/0089008 | A1* | 4/2005 | Choo et al. ................. 370/349 |
| 2005/0094601 | A1 | 5/2005 | Hsu et al. |
| 2005/0174939 | A1* | 8/2005 | Willey et al. .............. 370/231 |
| 2005/0207425 | A1* | 9/2005 | Choo ..................... 370/395.52 |
| 2005/0276273 | A1* | 12/2005 | Oprescu-Surcobe et al. 370/401 |
| 2006/0056361 | A1* | 3/2006 | Jiang et al. ................. 370/335 |
| 2006/0126589 | A1 | 6/2006 | Sayeedi |
| 2007/0047562 | A1* | 3/2007 | Sayeedi et al. ............. 370/401 |

\* cited by examiner

*Primary Examiner*—Rafael Pérez-Gutiérrez
*Assistant Examiner*—Issam Chakour
(74) *Attorney, Agent, or Firm*—Brian M. Mancini

(57) ABSTRACT

An apparatus and method for efficient transitions between operating states in a communication network, includes a preliminary step of having a mobile station in a Dormant or Idle state. A next step includes requiring a data transfer, either to or from the mobile station. A next step includes transitioning the mobile station from the Dormant or Idle to an Active state. A next step includes transferring a bearer path context for the data from a Paging Control Function (PCF) to an RF Bearer Function. This can include creating a tunnel using an Inter-PCF handoff procedure. The result is a direct connection between an RF Bearer Function and an IP Router, without the PCF being in the data path.

20 Claims, 6 Drawing Sheets

EFFICIENT TRANSITIONS BETWEEN OPERATING STATES IN A COMMUNICATION NETWORK

FIELD OF THE INVENTION

The present invention relates generally to the field of communication systems, and more particularly, to call setup in communications equipment.

BACKGROUND OF THE INVENTION

3GPP2 packet data standard TIA/EIA/IS835 CDMA 2000 Wireless IP Network Standard, (IS-835) and the IEEE 802.16-2005 standard herein referred to as WiMAX) communication standard, among other packet data communication systems, can specify an Active state and a Dormant (Idle) state for a wireless communication device, such as a mobile station (MS), during a packet data session. In the Active state, the MS is connected to infrastructure equipment via a dedicated RF connection. For example, in IS-835 the infrastructure provides a dedicated connection between a Base Transceiver Station (BTS) and a Packet Control Function (PCF). The PCF is connected to a Packet Data Service Node, which is connected to a packet network. A packet call is moved into the Active state when there is a burst of packet data to transmit. The packet call may transition between the Active state and the Dormant (Idle) state many times, depending on the bursty nature of the data and on the duration of the time period.

In the Dormant state, when the MS is not transmitting or receiving data, the dedicated Radio Frequency (RF) connection and the dedicated connection between the BTS and the PCF are released. The packet call transitions from the Active state to the Dormant state when there has been no data transmission for a predetermined time period. While the packet session is in the Dormant state, bearer data cannot be transmitted, and must be buffered. A network element is responsible for tracking the MS mobility, receiving packet data, and buffering it until the MS becomes active again. For example, the Packet Control Function is only useful when the mobile is Dormant. It keeps the context for the Dormant mobile and maintains a tunnel with the PDSN. When the data starts to flow from the network side, the PDSN forwards the packet to the PCF which causes the PCF to transmit a BS Service request to the MSC. The mobile is then paged and when it responds a traffic channel (TCH) and Selector are assigned to the mobile which then transitions from Dormant to Active state. In short, in order to transmit buffered data to the MS, the call must be assigned a dedicated RF connection, and a dedicated connection between the BTS and the PCF must be re-established. The delay incurred in order to re-establish a dedicated connection between the MS and the PCF (i.e. tunneling and detunneling across the A10 and A8 interfaces) has a negative impact on the quality of the data service. Moreover, during the Active state the PCF acts as nothing more than a conduit for the data between the MS and the PDSN. Thus, the PCF resources are unnecessary when the mobile is Active. A similar process occurs for WiMAX communications.

Current standards impose a high transaction cost on centralized processing elements for the time needed for Dormant (Idle) to Active transitions. The time needed has a potentially negative impact on a subscriber's perception of data service. These problems encourage configurations where the RF connection is maintained for a long period of time after transmission of a data burst, so that a subsequent data burst can immediately be transmitted. However, maintaining a connection for an unnecessarily long period of time is an inefficient use of RF resources. For example, if a channel is maintained for sixty seconds for transmission of a series of bursts of packet data, one channel can offer sixty Busy Hour Call Attempts (one channel*3600/60). If, however, the channel is maintained for only five seconds for transmission of a burst, one channel can offer 720 BHCA (1 channel*3600/5). In the latter case, Dormant to Active transitions (i.e. call attempts) will increase because the channel is maintained for a shorter period of time. In the former case, the long timeout period decreases the effective utilization of the dedicated channel, and increases the number of dedicated channels required to support the packet data service.

One prior art solution, provided in U.S. Pat. No. 6,965,588, introduces a Semi-Dormant state to address this problem. In this reference, for the Dormant state, the network element maintaining the connection to the PDSN is the PCF, and in the Semi-Dormant state, the network element maintaining the connection between to the PDSN is the Selection and Distribution Unit (SDU). In the Dormant state, the SDU is released, with the PCF maintaining the connection to the PDSN. When the MS is in the Semi-Dormant state, the network element maintaining the connection between the BS and the PDSN for the call is the SDU. When a mobile moves from the Active to the Semi-Dormant state, the traffic channel is released but the SDU stays assigned. A path exists between the SDU and the PDSN via the PCF. When the mobile is in the Semi-Dormant state, there are paths between the SDU to the PCF and the PCF to the PDSN. No traffic channel exists over the RF connection. Once the mobile transitions from the Dormant to the Active state, a traffic channel will exist from the MS to the SDU via the BTS. However, this results in the PCF always being present and utilized. The mobile is sent addresses of the serving element and the IP address of both the PCF and SDU are sent to the mobile, so that when the mobile goes Active both the SDU and PCF elements serving that mobile can be quickly identified. This solution, although effective requires a third, Semi-Dormant state to be coordinated, and still requires the PCF in the communication path while the mobile is Active, which wastes RF resources.

Therefore, there is a need for a method and apparatus for efficient transitions between operating states in a communication network, and in particular for transitioning a wireless communication device between the Dormant state and Active state by efficient connection of RF resources dependent upon whether there is bearer data to transmit.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENTS

The present invention provides a method and apparatus for efficient transitions between operating states in a communication network, and in particular for transitioning a wireless communication device between a Dormant or Idle state and an Active state by efficient connection of RF resources dependent upon whether there is bearer data to transmit.

In the prior art, a wireless communication device such as a mobile station (MS) can be in a call with Base Site (BS) equipment. The call connection is supported by an RF bearer function, such as a BS and a Selector through to a Paging Control Function, such as a Packet Control Function (PCF), and on to an IP Routing Function, such as a Packet Data Service Node (PDSN). When the call (connection) is released between the MS and BS, the BS provides the MS with the equipment identifiers of the network elements that maintain the connection with the Packet Data Service Node (PDSN), and disconnects the RF Bearer. The MS retains the identifiers and sends the appropriate identifier to the BS when requesting reactivation (transition to Active state). In the Dormant or Idle state (or Inactive state as used herein), the network element maintaining the connection to the PDSN is the PCF because the RF Bearer has been released and disconnected. When the BS receives the reactivation request from the MS, it connects the PCF to the RF Bearer path that is established to the MS.

In accordance with the present invention, the PCF is bypassed when re-establishing an Active state. Instead of re-connection through the PCF, when the BS receives the reactivation request from the MS, it connects the RF Bearer Function directly to the IP Routing Function. Advantageously, this can be done without network hardware modifications. Details of the invention will now be described with reference to the figures.

Figure 1:
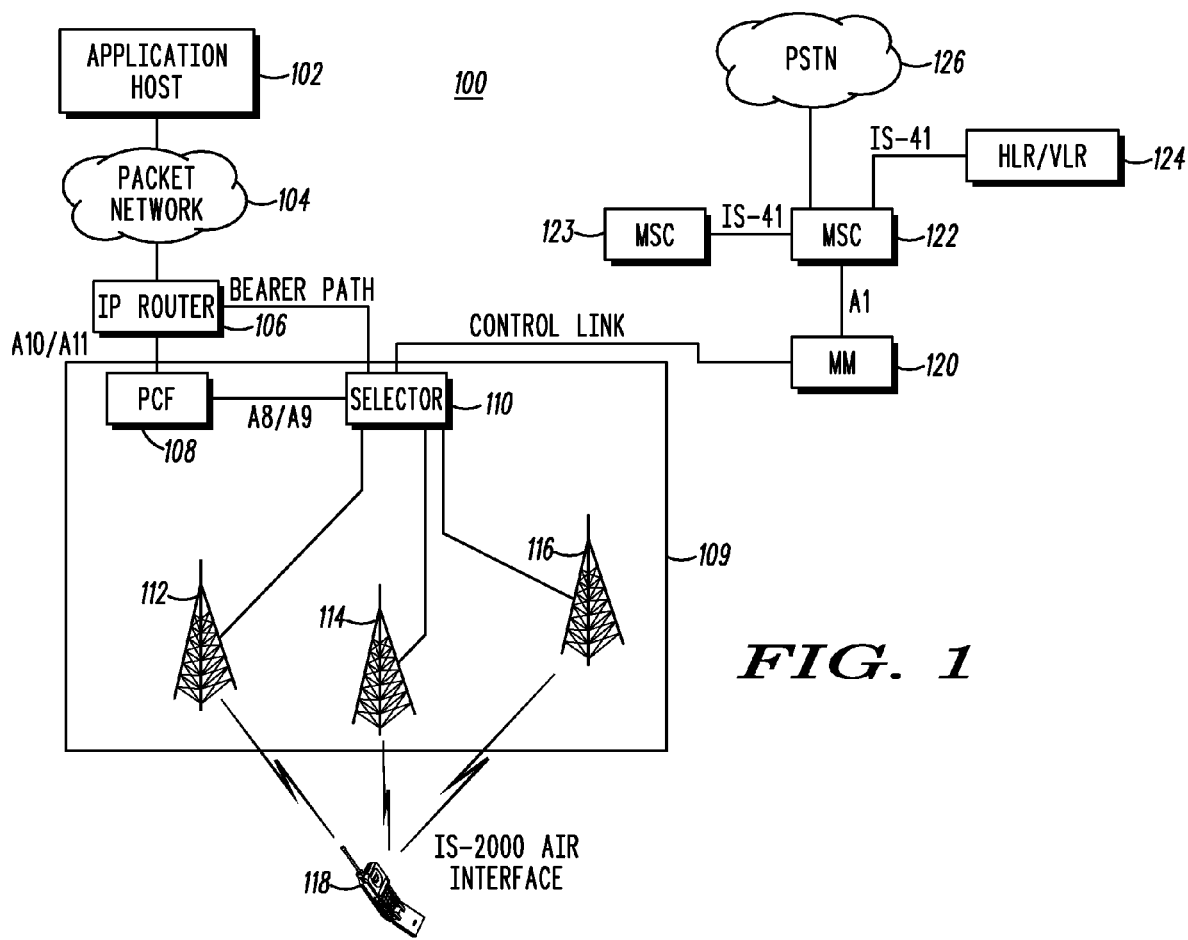
FIG. 1 is a functional block diagram of a system that can be used to implement the apparatus and method of the present invention.
Figure 2:
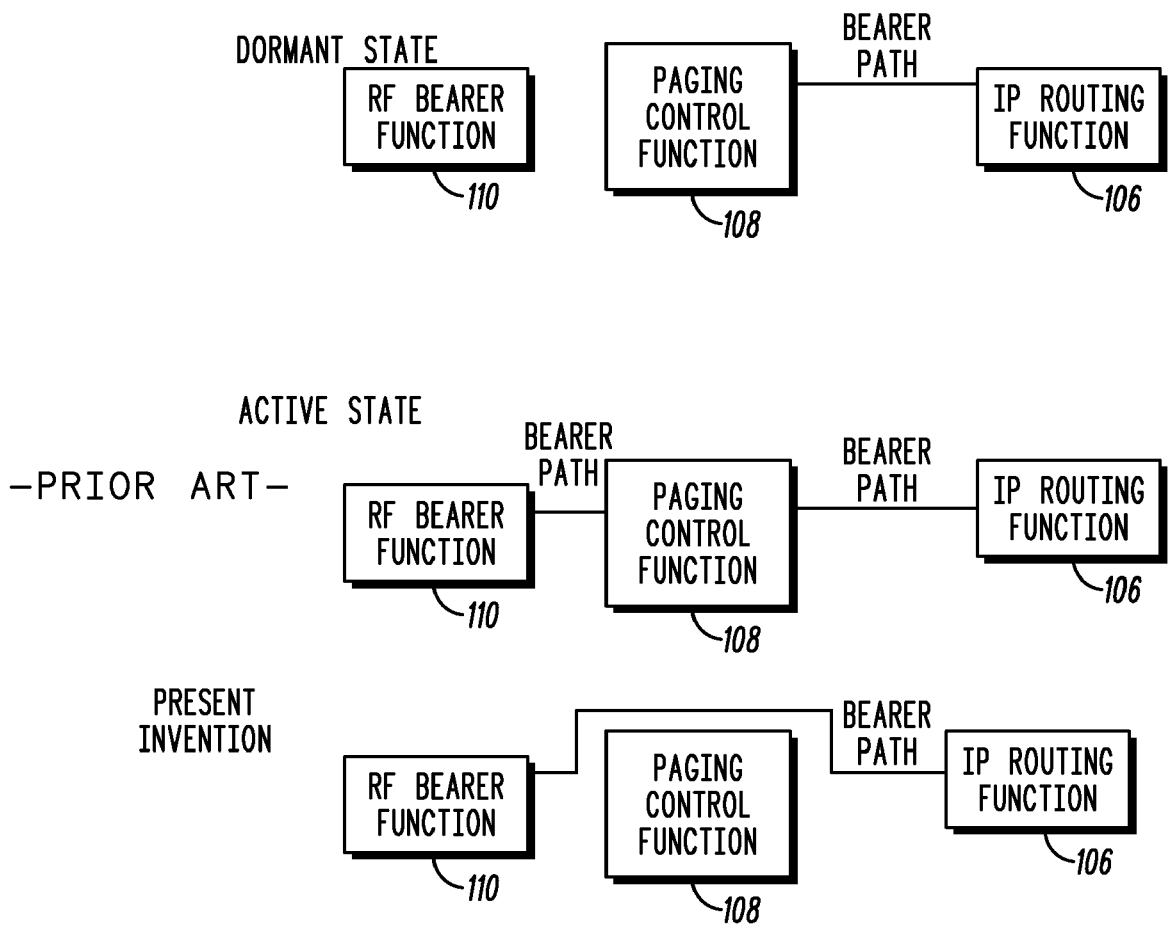
FIG. 2 is a block diagram of operational changes of a first embodiment introduced by the present invention.

FIGS. 1 and 2 show functional block diagrams of a communication network, in accordance with a Code Division Multiple Access (CDMA) embodiment of the present invention. An MS 118 is in soft handoff with three BTSs 112, 114, 116 for communicating with an Application Host 102. The Application Host 102 is connected to a Packet Network 104 for uploading and downloading information. The Packet Network 104 is connected to an IP Router 106. The IP Router 106 provides the interface between the Packet Network 104 and the BS equipment 109 for packet data services. The IP Router 106 is connected to a Paging Control Function (PCF) 108, which in turn is connected to a Selector 110. The PCF contains a Mobility Registrar and the ability to queue incoming packets from the network.

In this first embodiment (as shown), the system 100 is an IS-835 communication network, wherein the IP Router 106 is a PDSN, the PCF 108 is a Packet Control Function and the RF Bearer Function 111 includes the Selector 110 and BTSs 112, 114, 116. In this embodiment, the PDSN communicates to the PCF over an A10/A11 interface. The PCF provides buffering for data received from the PDSN. The PCF is connected to the Selector for the BTSs over an A8/A9 interface. In this embodiment, the present invention is operable over a layer 3 bearer.

Figure 3:
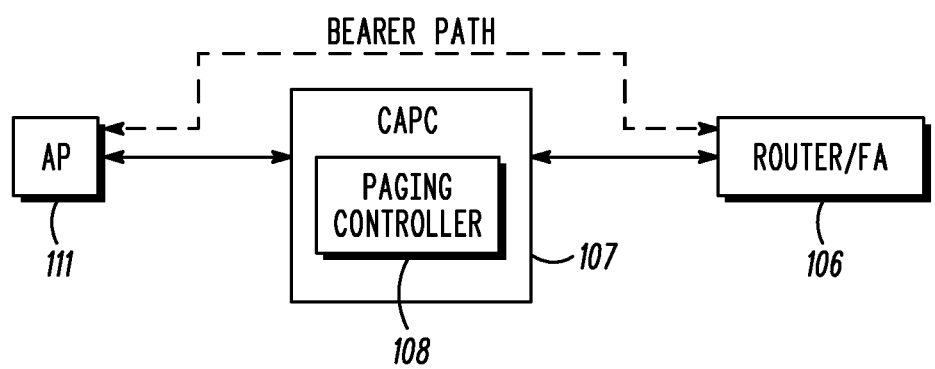
FIG. 3 is a block diagram of operational changes of a second embodiment introduced by the present invention.

In a second embodiment, as shown in FIG. 3, the system 100 can be a WiMAX communication network, wherein the IP Router Function 106 is a Router or Foreign Agent (FA, as will be used in the examples herein), the PCF 108 is a Paging Controller 108 of a Cellular Access Point Controller (CAPC) 107 and the RF Bearer Function 110 is one or more Access Points (AP) for a user. In this embodiment, the FA 106 communicates to the Paging Controller 108, which provides buffering for data received from the FA 106. The Paging Controller 108 communicates with the AP. In this embodiment, the present invention is operable over a layer 2 switched network.

The IP Routing function 106 may be an FA or it may be a simple off the shelf router for non-mobile stations. The Paging Controller 108 is included in the bearer path only when an MS is idle. The Paging Controller 108 is removed from the bearer path when the MS is active. The Paging Controller 108 contains a location register in the CAPC that tracks the paging area a mobile has gone idle within. The Paging Controller 108 has the ability to queue incoming packets from the network. The serving access point (AP) makes up the RF bearer function 111. APs are grouped into paging areas, and mobiles that are idle can move anywhere within a paging area without performing a location update with the location registrar in the CAPC.

Returning to the example of the first embodiment for an IS-835 network in FIGS. 1 and 2, the Selector 110 of the RF Bearer Function maintains soft handoffs between the MS 118 and the BTSs 112, 114, 116. The Selector 110 also selects the best data transmission received from the MS 118 via the BTS 112, 114, 116 for transmission to the PCF 108 and distributes copies of data destined for the MS 118 to all BTSs 112, 114, 116 that the MS 118 is in soft handoff with. Control messages to/from the MS 118 originate/terminate at the Selector 110. The BTSs 112, 114, 116 transmit and receive bearer data and control information over a dedicated RF traffic channel to the MS 118.

The Selector is also connected to a Mobility Manager (MM) 120 via a control link. The MM 120 provides control functions for calls connected on the BS equipment 109. For example, the MM 120 monitors the state of a call and determines when the call should be released, decides when soft handoff should occur, and decides which BTSs should be added or dropped in soft handoff, etc. The MM 120 is connected to a Mobile Switching Center (MSC) 122 over an A1 interface (as specified in IS-835). The MSC 122 interfaces the MM 120 to the Public Switch Telephone Network (PSTN) 126. The MSC 122 is also connected to a Home Location Register/Visitor Location Register (HLR/VLR) 124 over an IS-41 interface. When the MS 118 is in its home network, the HLR 124 determines the location of the MS 118 and provides information to the MSC 122. When the MS 118 is in a visitor network, the VLR 124 obtains a copy of the HLR information and provides it to a MSC, such as MSC 123, in the visitor network. MSC 122 and MSC 123 are connected via an IS-41 interface. It should be recognized that the Location Register and paging functions can be implemented in different network elements based on technology and network architecture. In the CDMA network, the PCF has the ability to store data for the mobile and works in cooperation with BSC and MSC to page the mobile.

The elements and interfaces shown in FIG. 1 are commonly known in the art, and thus are not described further herein. It should also be recognized that the invention is also applicable to the WiMAX network of FIG. 3, or other packet data network, having a similar analogue to that described for IS-835 described herein, and thus need not be described further.

The present invention provides a solution for tunneling and de-tunneling delays wherein the PCF resources are no longer wasted when the mobile is in Active state. By having the RF Bearer directly connect with the IP Router, delay in packet transfer is greatly reduced which is a significant advantage to realtime services that require low latency.

Referring to FIGS. 2 and 3, when a mobile becomes Active the bearer path context is transferred from the PCF 108 to the RF Bearer Function 111. The RF Bearer Function 110 then uses Inter-PCF handoff procedures with the IP Router Function and creates a tunnel between itself and the IR Router. The communication standards for the particular implementing network are not impacted by this process, but the invention requires that to the IP Router Function 106 the RF Bearer Function 111 appears as a Paging Control Function 108 and has a security context for the control communications.

For example, in the IS-835 embodiment, when a mobile becomes Active the bearer path A10 context is transferred from the PCF to the Selector. The Selector then uses A11 Inter-PCF handoff procedures with the PDSN and creates an A10 tunnel between itself and the PDSN. The A10/A11 standards are not impacted. To the PDSN the Selector will appear as a PCF and have a security context for A11 communications. This approach will decrease the call set up time than if the call is processed in the same sequence as in the prior art.

In the CDMA case, the present invention is applicable to both cases of where; a) the network has packet data to be transferred to the MS, or b) the MS is initiating a packet data transfer. In the WiMAX case, the present invention is applicable to the case where an MS switches; a) from Active to Idle Mode, and b) from Idle to Active Mode.

Figure 4:
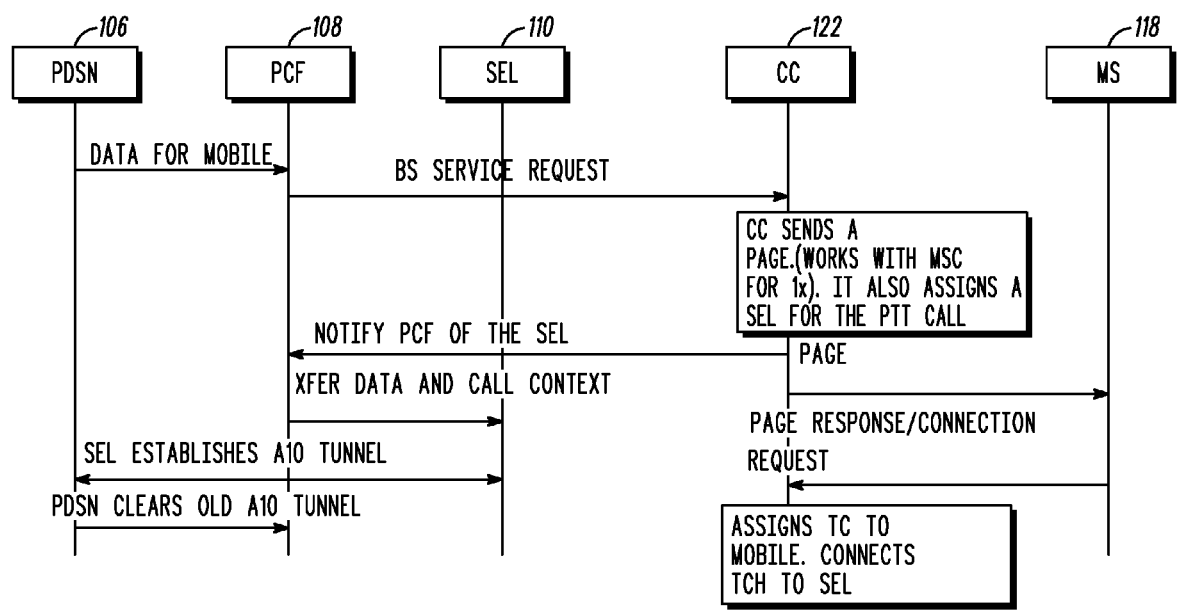
FIG. 4 is a flow chart of a first embodiment of the present invention where data transfer is initiated by the network.
Figure 5:
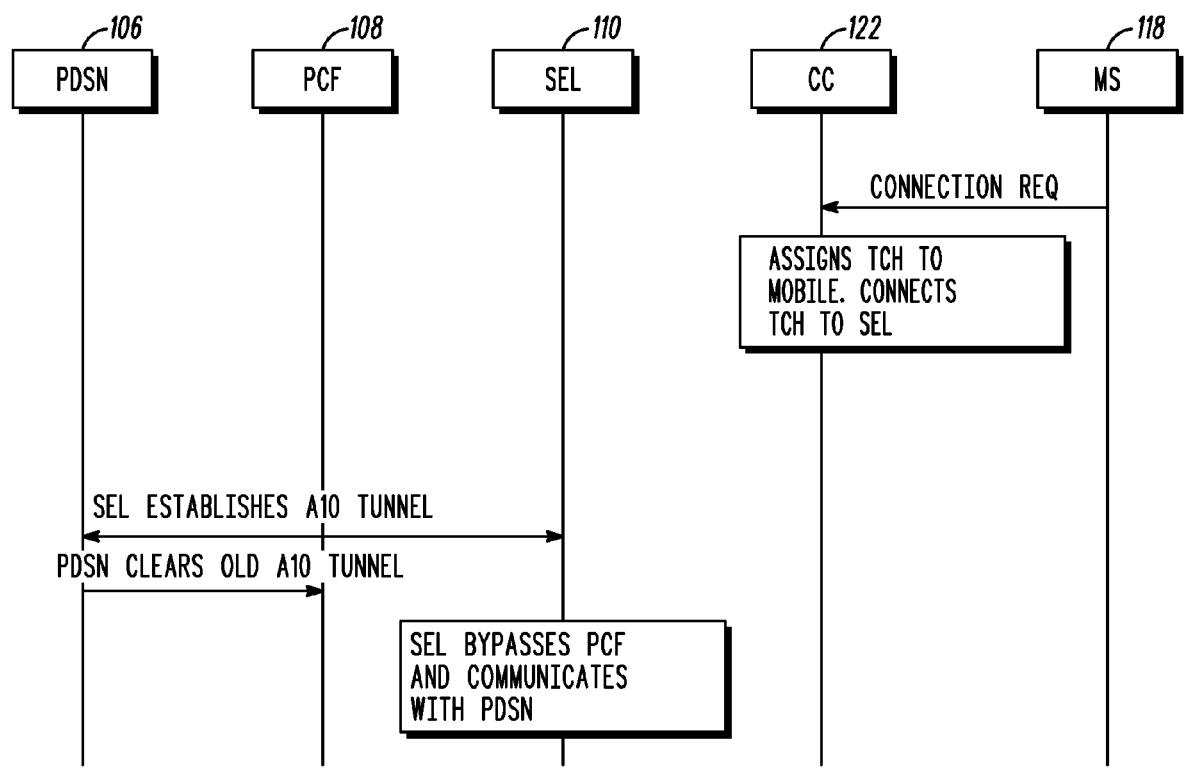
FIG. 5 is a flow chart of a first embodiment of the present invention where data transfer is initiated by the mobile station.

FIG. 4 refers to the case where an IS-835 network has packet data to be transferred to the MS. In this instance, when the PCF 108 receives data for a Dormant MS 118, it alerts the Call Control (CC) functionality in the Base Station Controller (BSC) that is responsible for A1 interface. The BSC will then ask the MSC 122 to page the MS by sending a BS Service Request to the CC. MSC will send a Page message on the A1 interface which results in the MS being paged over the air. When the MS responds, a Selector 110 is assigned for the MS. The PCF 108 will transfer the call context and the buffered data for the mobile to that Selector. The Selector can then set up A10 tunnel with the PDSN 106.

While the establishment of the A10 tunnel can be accomplished in nearly the same time as the traditional establishment of A8, the context and data transfer to the Selector is an additional step. Therefore, for real time applications where call setup time is crucial, such as Push-to-Talk (PTT), the Selector will be assigned after the PCF receives data for the Dormant MS and ahead of the page response from the MS. When the MS enters Dormant mode, the Selector will notify the PCF and allow the PCF to move the tunnel back to itself. Once again inter-PCF handoff techniques are used to accomplish the tunnel transfer.

FIG. 4 refers to the case where an MS wants to originate a packet data transfer in an IS-835 network. In this instance, when the MS transitions from Dormant to Active state due to call origination, the present invention allows the Selector 110 to bypass the PCF 108 and transfer the A10 tunnel over to itself. In particular, the MS alerts the Call Control (CC) functionality in the BSC. A Selector 110 is assigned for the MS, and transfer the A10 tunnel to the PDSN 106 over to itself, wherein the PDSN 106 clears the old A10 tunnel. As a result, the Selector 110 bypasses the PCF and communicates directly with the PDSN 106.

Figure 6:
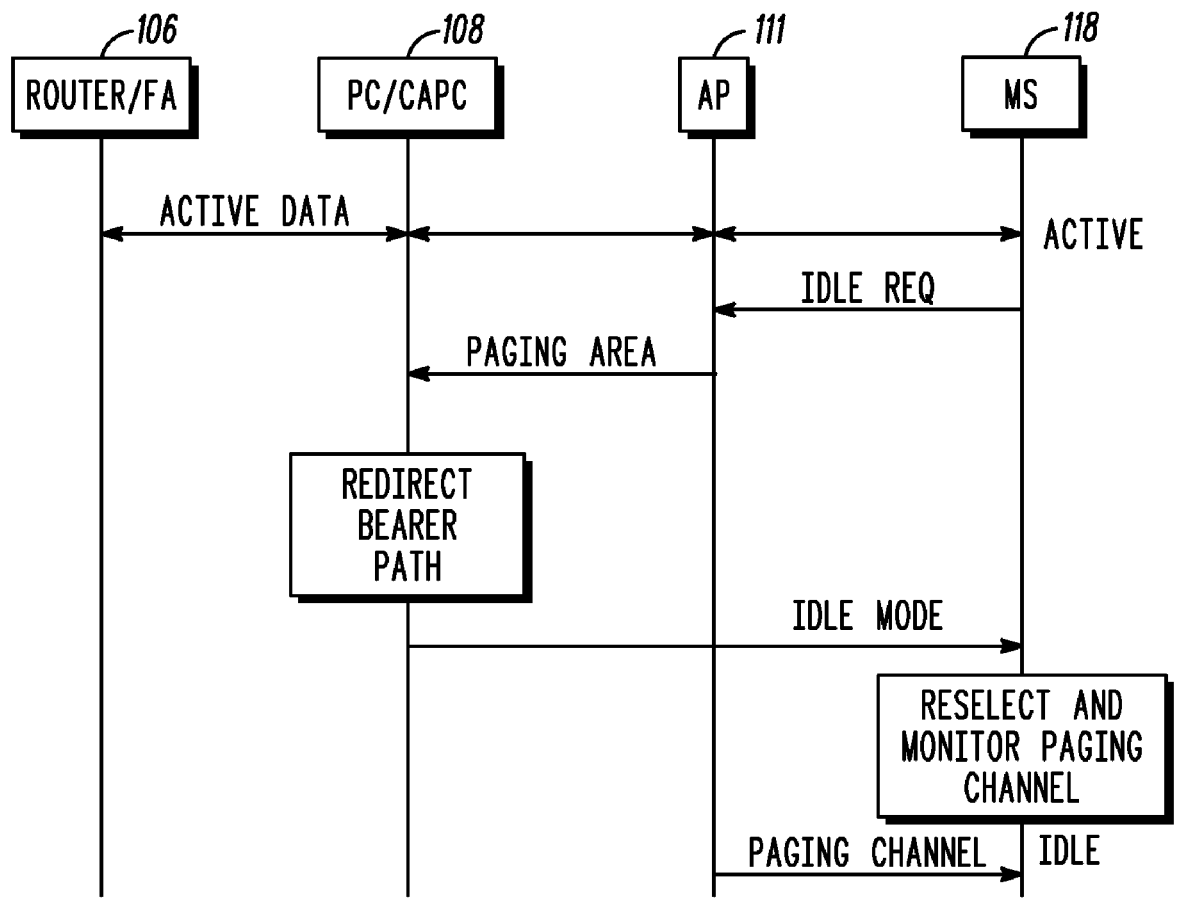
FIG. 6 is a flow chart of a second embodiment of the present invention illustrating an active-to-idle state transition.
Figure 7:
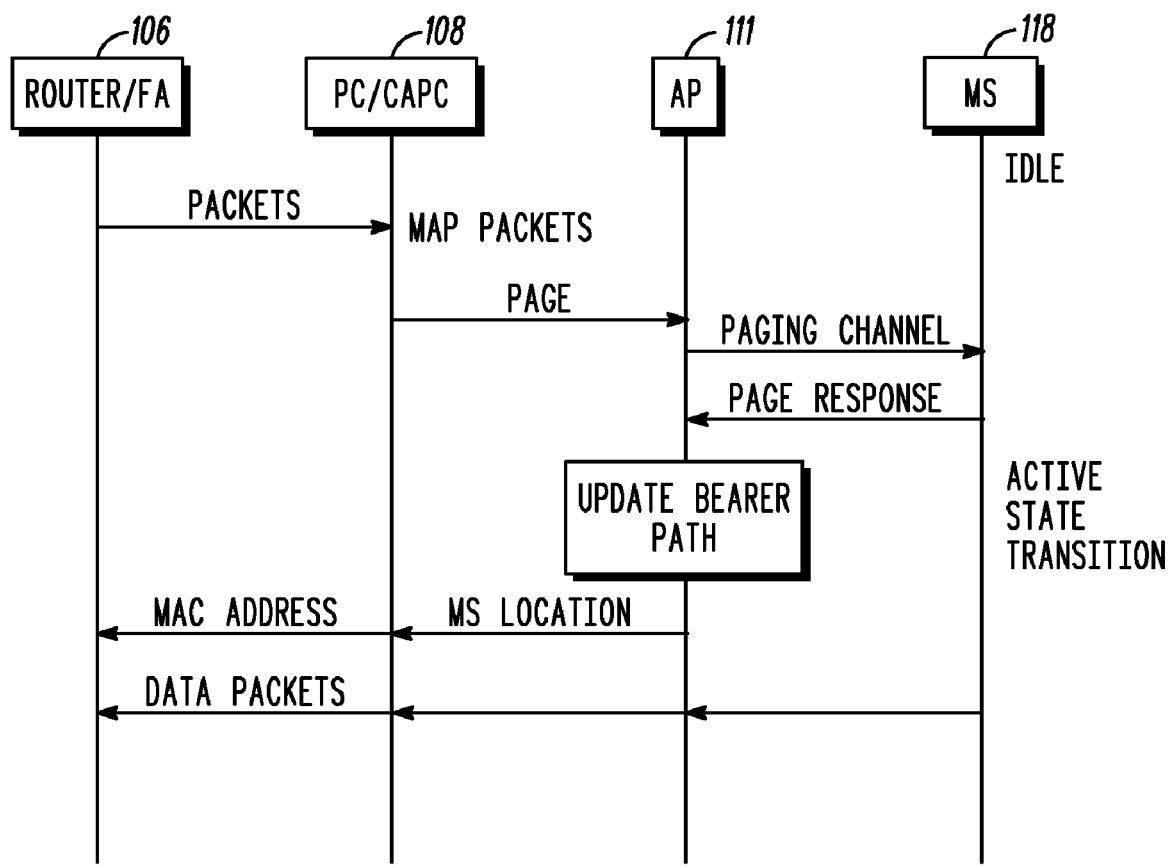
FIG. 7 is a flow chart of a second embodiment of the present invention illustrating an idle-to-active state transition.

FIGS. 6 and 7 show an example of the present invention in a WiMAX communication system. In IEEE 802.16-2005 (WiMAX), the transport connection is enabled by the Access Point (AP) and the data is delivered from the IP routing function directly to the AP when the MS is Active. When the MS is not active, the transport connection is idle and the AP has released all RF resources and instead the paging controller function (PCF) in the Cellular Access Point Controller (CAPC) is responsible for intercepting and queuing incoming data for the mobile from the network. Upon the reception of a packet for an idle MS, the PCF in the CAPC will page all of the APs in the paging area last known to contain the MS. When the MS is activated (i.e. responds to a page) the queued data is sent to the AP that now is associated with the activated MS. The queued data is delivered to the MS while the bearer path between the AP and IP routing function is redirected to point directly to the AP. Typically, in the idle state, RF Bearer Function is released.

FIG. 6 shows the case where a WiBB connection switches from Active to Idle Modes, wherein a MS requests idle mode and network releases RF bearer resources. In the Active Mode, the MS is Active and bearer data is flowing between Router/FA and AP for the mobile station. The MS then sends a request to the AP to enter idle mode. The AP then informs the location registrar of the paging area in which the MS has requested idle mode support within the CAPC. The Paging Control Function within the CAPC then redirects the bearer path to itself for this particular MS. For example, this can be done by sending a Layer 2 packet from the CAPC to the IP routing function so that the interleaving Layer 2 switches learn the correct ports for which the MAC address of the MS is now reachable, so that subsequent downlink packets will follow the reverse path back to the Paging Control Function within the CAPC. Then the MS is told to enter idle mode. At this point, MS can silently reselect and monitor the paging channel on any AP in the paging area.

FIG. 7 shows the case where a WiMAX connection switches from Idle to Active Modes, wherein bearer data for the MS arrives at the Router/FA and is delivered to the MS. In the Idle Mode, the Router/FA delivers data packets to Paging Controller (as detailed previously above). The CAPC maps the packet to the paging area the MS was last associated with and queues the packet. The CAPC sends a page to all the APs that are part of the paging area. The MS monitoring a paging channel on one of the APs, responds to the page and attempts to transition to the active state. The AP informs the CAPC that it has located the MS and also updates the bearer path, so that subsequent data packets are sent by the Router/FA directly to the AP. Any packets sourced by the MS are sent to the AP. The CAPC delivers all the queued packets to the AP. Then the CAPC is no longer in the bearer path.

The network between the Router/FA, CAPC and the AP is a Layer 2 Ethernet network. The bearer is redirected easily by sending an Ethernet control packet from either the AP or the CAPC to the Router/FA. The Ethernet frames include the Media Access Control (MAC) address of the MS's so each MS has its own data path through the Layer 2 network. The layer 2 switches update which the ports from which packets with a given MAC address arrive at so that packets in the reverse direction follow the same path back down through the network.

It should be noted that in the present invention, a system operator can tune the operation of Active and Dormant (or Idle) state transitions in order to strike an optimal balance between quality of the data service from a subscriber perspective, RF channel utilization, battery power, and access channel capacity. This tuning can be achieved by modifying the time that the MS is in the Dormant (Idle) state.

The present invention has broad applications in new wireless architectures that are IP based, such as WiMAX, CDMA-1X and EvDO architectures. In any wireless network, not all powered-on mobiles can be using the available RF resources at all times. The concept of Idle, Dormant and Active states are universal to wireless networks. When the mobiles are Dormant they have established a session context. When the mobile becomes Active, BTS and BSC resources are assigned. In the present invention, the network entity that keeps this session context does not need to be in the path of the bearer data just because it keeps the context. The present invention takes advantage of the already established Inter-PCF handoff techniques in a new way to eliminate the PCF from the bearer path when the mobile becomes active The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for efficient transitions between operating states in a communication network, the method comprising the steps of:
   having a mobile station in a Inactive state;
   requiring a data transfer;
   transitioning the mobile station from the Inactive to an Active state; and
   transferring a bearer path context for the data from a Paging Control Function (PCF) to an RF
   Bearer Function such that the RF Bearer Function bypasses the PCF.

2. The method of claim 1, wherein the transferring step includes creating a tunnel using an Inter-PCF handoff procedure.

3. The method of claim 1, wherein the transferring step includes directly connecting the RF Bearer Function to an IP Router Function, without the PCF being in the data path.

4. The method of claim 3, wherein the PCF provides the control for transferring step.

5. The method of claim 3, wherein the RF Bearer Function appears as the PCF to the IP Router.

6. The method of claim 3, wherein the RF Bearer Function is a Selector and at least one Base Station, the PCF is a Packet Control Function, and the IP Router is a Packet Data Service Node (PDSN), and wherein the transferring step includes transferring the bearer path A10 context tunnel from the Packet Control Function to the Selector.

7. The method of claim 3, wherein the RF Bearer Function is a Selector, the PCF is a Packet Control Function, and the IP Router is a Packet Data Service Node (PDSN), and wherein the requiring step includes the PCF receiving data for transfer to the Inactive mobile station, whereinafter further comprising the steps of:
   alerting a Call Control (CC) functionality in a Base Station Controller (BSC) that is responsible for an A1 interface;
   sending a BS Service Request to the CC;
   sending a page message on the A1 interface to the mobile station;
   responding to the page message; and
   assigning a Selector for the mobile station,
   wherein the transferring step includes transferring the call context and the buffered data for the mobile station to that Selector, and setting up an A10 tunnel with the PDSN.

8. The method of claim 7 wherein the assigning step is performed after the receiving step and before the responding step.

9. The method of claim 7, further comprising the steps of:
   entering the Inactive state by the mobile station;
   notifying the PCF thereof and
   allowing the PCF to move the A10 tunnel back to itself.

10. The method of claim 3, wherein the RF Bearer Function is a Selector and at least one Base Station, the PCF is a Packet Control Function, and the IP Router is a Packet Data Service Node (PDSN), and wherein the requiring step includes the mobile station originating data for transfer from the mobile station, wherein the transferring step includes allowing the Selector to bypass the PCF and transfer the A10 tunnel over to itself.

11. The method of claim 1, wherein the RF Bearer Function is an Access Point (AP), the PCF is a Paging Control Function, and the IP Router is one of the group of a standard IP Router and a Foreign Agent (FA), and wherein the requiring step includes the PCF queuing incoming data for transfer to an Inactive mobile station, and wherein the transferring step includes allowing the AP to bypass the PCF and transfer a transport connection directly to the IP Router.

12. A method for efficient transitions between operating states in a communication network, the method comprising the steps of:
having a mobile station in an Inactive state;
requiring a data transfer;
transitioning the mobile station from the Inactive to an Active state;
transferring a bearer path context by a Paging Control Function (PCF) for the data from the PCF to an RF Bearer Function, whereupon the RF Bearer Function is directly connected to an IP Router without the PCF being in the data path; and
transferring the data.

13. The method of claim 12, wherein the transferring step includes creating a tunnel using an Inter-PCF handoff procedure.

14. A system for efficient transitions between operating states in a communication network, the system comprising:
a mobile station (MS) in an Inactive state, the mobile station requiring a data transfer between the network and the mobile station, the MS transitioning from the Inactive state to an Active state;
an RF Bearer Function;
an IP Router Function; and
a paging controller that transfers a bearer path context for the data from the paging controller to the RF Bearer Function, whereupon the RF Bearer Function is directly connected to an IP Router without the paging controller being in the data path.

15. The system of claim 14, wherein the paging controller creates a tunnel using an Inter-PCF handoff procedure.

16. The system of claim 14, wherein the RF Bearer Function appears as the paging controller to the IP Router.

17. The system of claim 14, wherein the RF Bearer Function is a Selector and at least one Base Station, the paging controller is a Packet Control Function (PCF), and the IP Router is a Packet Data Service Node (PDSN), and wherein the PCF transfers the bearer path A10 context tunnel from the PCF to the Selector.

18. The system of claim 14, wherein the RF Bearer Function is a Selector and at least one Base Station, the paging controller is a Packet Control Function (PCF), and the IP Router is a Packet Data Service Node (PDSN), and further comprising a Call Control (CC) Function, and wherein the PCF receives data for transfer to the Dormant mobile station, alerts the CC in a Base Station Controller (BSC) that is responsible for an A1 interface, sends a BS Service Request to the CC, wherein the CC sends a page message on the A1 interface to the MS, receives a response to the page message from the MS, and assigns a Selector for the mobile station, whereupon the PCF transfers the call context and the buffered data for the mobile station to that Selector, and sets up an A10 tunnel with the PDSN.

19. The system of claim 14, wherein the RF Bearer Function is a Selector and at least one Base Station, the PCF is a Packet Control Function (PCF), and the IP Router is a Packet Data Service Node (PDSN), and wherein the mobile station originates data for transfer to the network, wherein the PCF allows the Selector to bypass the PCF and transfer the A10 tunnel over to itself.

20. The system of claim 14, wherein the RF Bearer Function is an Access Point (AP), and the IP Router is one of the group of a standard IP router and a Foreign Agent (FA), and wherein the requiring step includes the paging controller queuing incoming data for transfer to an Idle state mobile station, allows the AP to bypass the PCF and transfer a transport connection directly to the IP Router.

* * * * *